United States Patent
Lee et al.

(10) Patent No.: US 7,221,418 B2
(45) Date of Patent: May 22, 2007

(54) LIQUID CRYSTAL DISPLAY DEVICE

(75) Inventors: Moon-gyu Lee, Suwon (KR); Hwan-young Choi, Anyang (KR); Jin-seung Choi, Suwon (KR); Jee-hong Min, Yongin (KR); Jin-hwan Kim, Suwon (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 95 days.

(21) Appl. No.: 10/624,541

(22) Filed: Jul. 23, 2003

(65) Prior Publication Data

US 2004/0135942 A1   Jul. 15, 2004

(30) Foreign Application Priority Data

Jan. 14, 2003   (KR) .................. 10-2003-0002381

(51) Int. Cl.
*G02F 1/1335* (2006.01)

(52) U.S. Cl. .......................... 349/113; 349/61

(58) Field of Classification Search ............ 349/61–64, 349/113
See application file for complete search history.

(56) References Cited

U.S. PATENT DOCUMENTS

| 6,196,691 B1 * | 3/2001 | Ochiai | 362/31 |
| 6,480,307 B1 * | 11/2002 | Yang | 359/15 |
| 2003/0067565 A1 * | 4/2003 | Yamamura | 349/65 |

FOREIGN PATENT DOCUMENTS

| EP | 0 913 721 A1 | 5/1999 |
| EP | 1 168 051 A1 | 1/2002 |
| EP | 1 197 789 A1 | 4/2002 |
| EP | 1 245 994 A1 | 10/2002 |
| JP | 06-258640 A | * 9/1994 |
| JP | 09-185082 A | * 7/1997 |
| JP | 10-111502 A | * 4/1998 |
| JP | 11-232919 A | 8/1999 |
| JP | 2000-330098 A | * 11/2000 |
| JP | 2000-347219 A | 12/2000 |
| JP | 2001-356327 A | * 12/2001 |
| JP | 2002-006135 A | * 1/2002 |
| JP | 2002-189230 A | 7/2002 |
| WO | WO 01/46722 A1 | 6/2001 |

OTHER PUBLICATIONS

Office Action issued by the Chinese Patent Office (Nov. 4, 2005).*

* cited by examiner

*Primary Examiner*—Dung T. Nguyen
(74) *Attorney, Agent, or Firm*—Sughrue Mion, PLLC

(57) ABSTRACT

A liquid crystal display device for displaying an image by changing orientation of a liquid crystal layer sealed between two substrates includes a lower substrate having a microstructure which outputs light incident on a side surface of the lower substrate to an upper surface of the lower substrate, a light source emitting light to the side surface of the lower substrate, a selective reflection panel provided on the upper surface of the lower substrate to reflect light having a predetermined incident angle or more and transmit the remaining light, and a reflection panel provided under the lower substrate.

3 Claims, 4 Drawing Sheets

LIQUID CRYSTAL DISPLAY DEVICE

BACKGROUND OF THE INVENTION

This application claims the priority of Korean Patent Application No. 2003-2381 filed on Jan. 14, 2003 in the Korean Intellectual Property Office, the disclosure of which is incorporated herein in its entirety by reference.

1. Field of the Invention

The present invention relates to a liquid crystal display device and, more particularly, to a liquid crystal display device having a backlight apparatus.

2. Description of the Related Art

FIG. 1 is a sectional view illustrating a conventional liquid crystal display device. Referring to FIG. 1, a liquid crystal display device includes a liquid crystal panel 10 and a backlight apparatus 30. The liquid crystal panel 10 is manufactured by sequentially depositing a lower substrate 1, a lower electrode 2, a liquid crystal layer 3, an upper electrode 4, and an upper substrate 5. Polarization panels 6 and 7 are further provided at a lower surface of the lower substrate 1 and an upper surface of the upper substrate 5, respectively. The liquid crystal panel 10 displays a desired image by changing orientation of liquid crystal molecules in the liquid crystal layer 3 according to an electric signal applied to the lower and upper electrodes 2 and 4 so as to transmit or block light input from the backlight apparatus 30.

The backlight apparatus 30 is an illumination apparatus for supplying light to the liquid crystal panel 10. The backlight apparatus 30 includes a light guide panel 12, a dispersion pattern 18, a reflection panel 11, and a light source 13. An optical film layer 20 is deposited on an upper surface of the light guide panel 12. The light emitted from the light source 13 is incident on a side surface of the light guide panel 12. The light guide panel 12 is a transmissive body having a refractive index of about 1.5, in which a critical angle is about 42°. Thus, of the light incident on the light guide panel 12, the light having an incident angle less than a critical angle with respect to the upper surface of the light guide panel 12 is exhausted through the upper surface of the light guide panel 12 and the remaining light is totally reflected and spreads in the entire area of the light guide panel 12. The dispersion pattern 18 is provided on a lower surface of the light guide panel 12. The dispersion pattern 18 disperses light and, as shown in FIG. 1, some of the dispersed light proceeds toward the upper surface of the light guide panel 12 and the light passing through the dispersion pattern 18 is reflected by the reflection panel 11 to proceed upward. Of the light proceeding upward, the light having an incident angle with respect to the upper surface of the light guide panel 12 that is less than a critical angle is transmitted, while the remaining light is totally reflected again and spreads inside the light guide panel 12. By repeating transmission, total reflection, and dispersion, the backlight 30 functions as a surface light source for supplying light to the liquid crystal panel 10.

The light passing through the upper surface of the light guide panel 12 is incident on the liquid crystal panel 10 via the optical film layer 20. The optical film layer 20 can include a diffusion panel 14, prism sheets 15 and 16, and a protector 17. The diffusion panel 14 makes the strength of the light exhausted from the upper surface of the light guide panel 12 uniform by diffusing the light. The prism sheets 15 and 16 improve brightness in a normal direction.

In the above-described liquid crystal display device, loss of light is generated as the light emitted from the light source is absorbed by a plurality of optical media such as the light guide panel and the optical film while the light passes through the respective media and arrives at the liquid crystal panel. Thus, a high power light source is needed to obtain a desired brightness from the liquid crystal panel. However, the high power light source normally has a large size and a great power consumption. Furthermore, since the thickness of the light guide panel is about 2–3 mm, there is a limit to making a thin liquid crystal display panel with a backlight apparatus using the light guide panel.

SUMMARY OF THE INVENTION

To solve the above and/or other problems, an apparatus consistent with the present invention provides a liquid crystal display device in which the number of optical media between the light source and the liquid crystal panel is reduced so that a thin, high brightness, and low priced liquid crystal device is realized.

According to an aspect of the present invention, a liquid crystal display device for displaying an image by changing orientation of a liquid crystal layer sealed between two substrates comprises a lower substrate having a microstructure which outputs light incident on a side surface of the lower substrate to an upper surface of the lower substrate, a light source emitting light to the side surface of the lower substrate, a selective reflection panel provided on the upper surface of the lower substrate to reflect light having a predetermined incident angle or greater and transmit the remaining light, and a reflection panel provided under the lower substrate.

The liquid crystal display device further comprises a polarization panel polarizing light incident on the liquid crystal layer. The polarization panel is disposed between the microstructure and the reflection panel. The polarization panel is disposed above the selective reflection panel.

The selective reflection panel further includes a polarization function to polarize light.

The microstructure is a holographic pattern having a diffraction grating structure. The holographic pattern is formed at at least one of a lower surface and the upper surface of the lower substrate. The interval between gratings of the holographic pattern is not greater than 2 μm.

According to another aspect of the present invention, a liquid crystal display device for displaying an image by changing orientation of a liquid crystal layer sealed between two substrates comprises a lower substrate having a microstructure which outputs light incident on a side surface of the lower substrate to an upper surface of the lower substrate, a light source emitting light to the side surface of the lower substrate, an optical panel provided on the upper surface of the lower substrate and including a selective reflection portion to reflect light having a predetermined incident angle or greater and transmit the remaining light, and a total reflection portion reflecting all light, and a reflection panel provided under the lower substrate.

The optical panel is formed such that at least one selective reflection portion and at least one total reflection portion are located in each pixel.

The microstructure is selectively formed only at a position where light is transmitted through the selective reflection portion.

BRIEF DESCRIPTION OF THE DRAWINGS

The above features of the present invention will become more apparent by describing in detail illustrative, non-limiting embodiments thereof with reference to the attached drawings, in which.

DETAILED DESCRIPTION OF ILLUSTRATIVE, NON-LIMITING EMBODIMENTS

Figure 1:
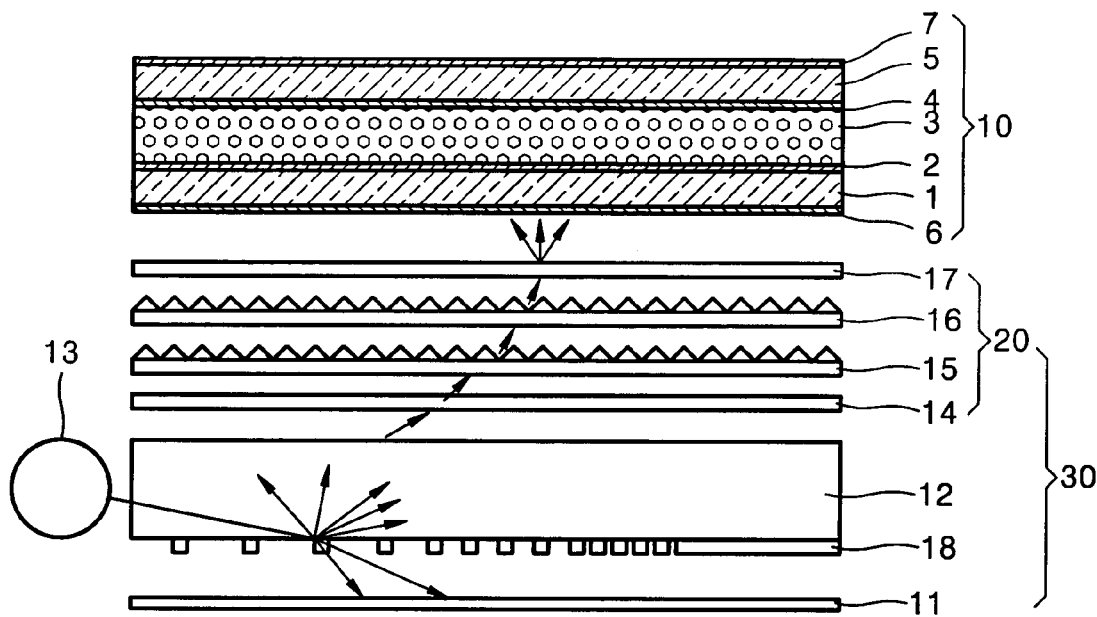
FIG. 1 is a sectional view illustrating a conventional liquid crystal display device.
Figure 2:
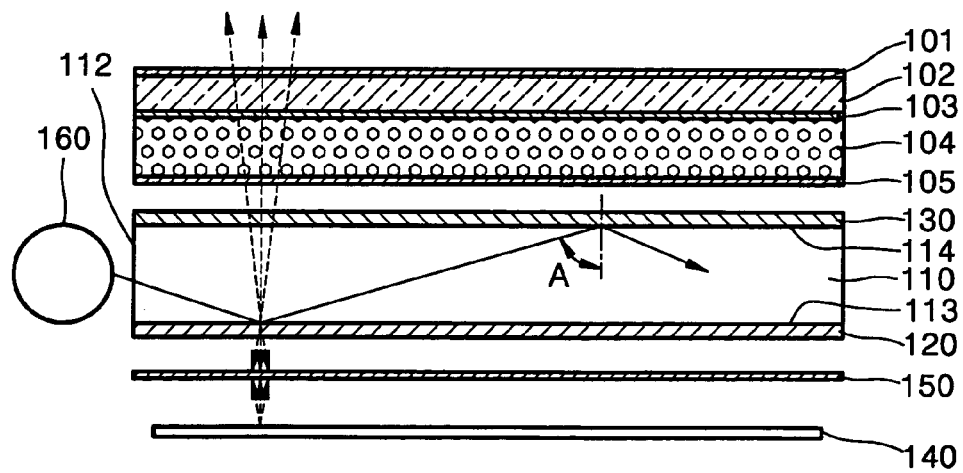
FIG. 2 is a sectional view illustrating a liquid crystal display device according to an illustrative, non-limiting embodiment of the present invention.

Referring to FIG. 2, a liquid crystal display device according to an illustrative, non-limiting embodiment of the present invention comprises an upper substrate 102, an upper electrode 103, a liquid crystal layer 104, a lower electrode 105, and a lower substrate 110. Liquid crystal molecules in the liquid crystal layer 104 are processed such that liquid crystal therein is oriented by an orientation film (not shown) in a predetermined direction. The lower substrate 110 and the upper substrate 102 are manufactured of normal glass into transmissive bodies. The upper electrode 103 and the lower electrode 105 are transparent conductive films to change the orientation of the liquid crystal layer 104 according to an electric signal applied. A polarization panel 101 may be further provided on the upper substrate 102.

A light source 160 is installed near the side surface 112 of the lower substrate 110. The light source 160 may be a point light source such as an LED (light emitting diode) or a linear light source such as CCFL (cold cathode fluorescent lamp). The light source 160 may be installed in a multiple number. Also, the light source 160 may be installed not only at one side surface of the lower substrate 110, but also at the other side surface thereof.

Figure 5:
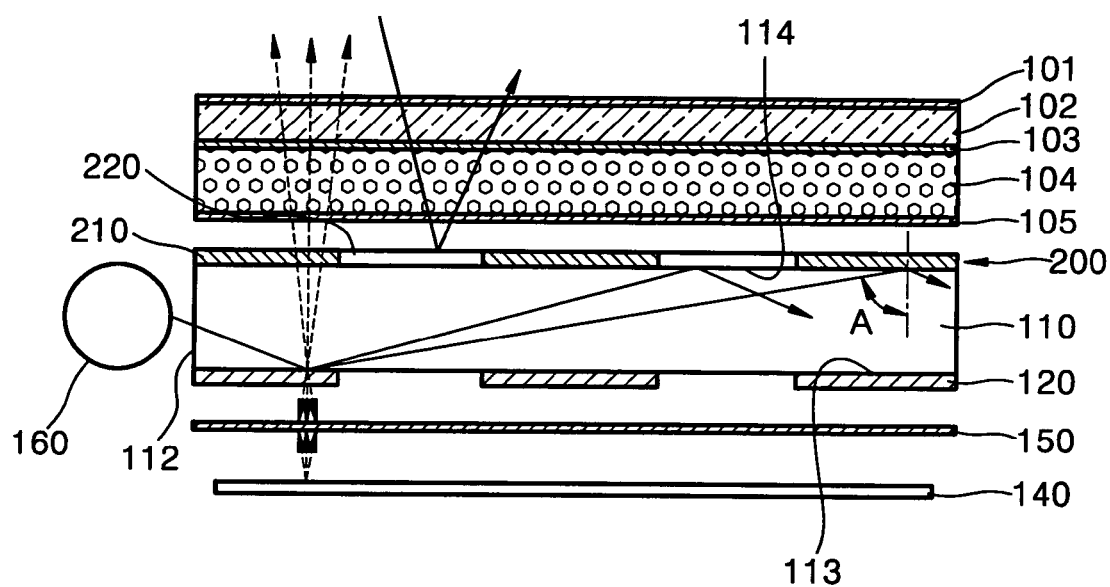
FIG. 5 is a sectional view illustrating a liquid crystal display device according to yet another illustrative, non-limiting embodiment of the present invention.
Figure 6:
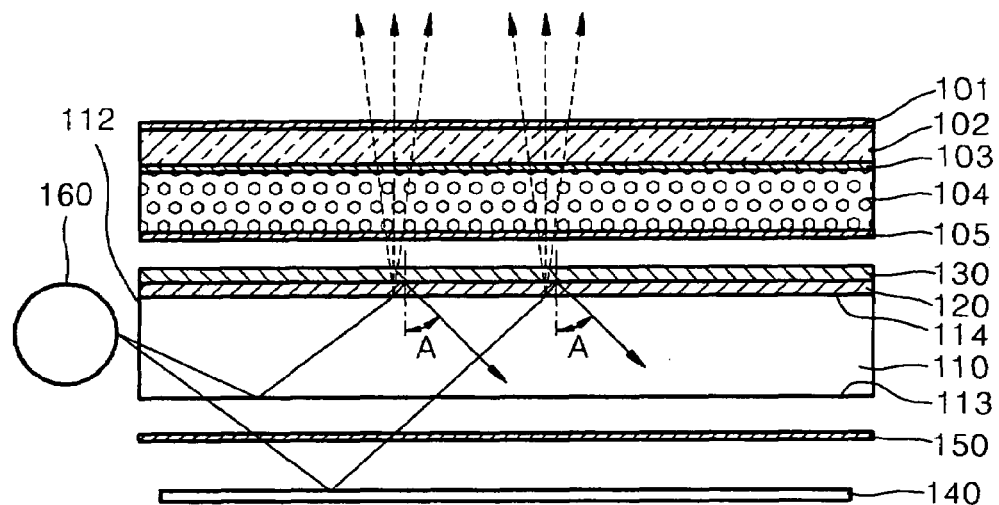
FIG. 6 is a sectional view illustrating a liquid crystal display device according to still another illustrative, non-limiting embodiment of the present invention.

A microstructure making the light emitted from the light source 160 and traveling inside the lower substrate 110 proceed upward is provided at the lower substrate 110. The microstructure may be a dispersion pattern or a holographic pattern having a diffraction grating structure. A holographic pattern having a grating interval of 2 μm or less is preferable in view of an efficiency in diffraction. In the present exemplary embodiment, a holographic pattern 120 having a grating interval of 0.4 μm and a grating depth of 0.2 μm is formed as the microstructure. The holographic pattern 120 can be provided on a lower surface 113 (as shown in FIG. 5) and/or an upper surface 114 (as shown in FIG. 6) of the lower substrate 110.

A reflection panel 140 is provided under the holographic pattern 120. The reflection panel 140 reflects upward the light proceeding downward by being diffracted by the holographic pattern 120.

In the liquid crystal display device consistent with the present invention, the lower substrate 110 functions as a light guide panel as well. Since, in the conventional liquid crystal display device, the lower electrode having a refractive index almost identical to that of the lower substrate is deposited on the upper surface of the lower substrate, a critical angle at which a total reflection occurs at a boundary surface between the lower substrate and the lower electrode is almost 90°. Thus, since the light input through the side surface of the lower substrate hardly generates total reflection at a boundary surface between the lower substrate and the lower electrode, the lower substrate cannot function as the light guide panel.

In the present exemplary embodiment, to use the lower substrate 110 as a light guide panel, a selective reflection panel 130 is provided on the upper surface 114 of the lower substrate 110. The selective reflection panel 130 reflects light having an incident angle A over a predetermined angle of the light incident on the upper surface 114 of the lower substrate 110 and transmits the remaining light. For example, for the lower substrate 110 to act as an acrylic based transparent resin (PMMA) light guide panel having a critical angle of about 42°, the selective reflection panel 130 is formed to reflect light having the incident angle A over 42° and transmit the light having the incident angle A not greater than 42°. The range of angles at which the selective reflection panel 130 transmits light can be appropriately selected considering brightness and uniformity in brightness of the liquid crystal display device. Also, since it is preferable that the light is output from the lower substrate 110 almost perpendicularly to the upper surface 114, the selective reflection panel 130 can be formed to transmit only light having the incident angle A of 30° or less, that is, the light making an angle over 60° with respect to the upper surface of the lower substrate 110.

A polarization panel 150 can be provided between the holographic pattern 120 and the reflection panel 140. The polarization direction of the polarization panel 150 may be the same as or different from that of the polarization panel 101 and is determined by the orientation direction of the liquid crystal layer 104 and according to whether light is transmitted or not when current is applied to the electrodes 103 and 105. The light is polarized in a predetermined direction before being input to the liquid crystal layer 104. Thus, the polarization panel 150 can be installed above the selective reflection panel 130.

In the operation and effect of the liquid crystal display device having the above structure according to the present invention, the light emitted from the light source 160 is incident on the lower substrate 110 through the side surface 112 of the lower substrate 110. The light proceeding toward the upper surface 114 in the lower substrate 110 transmits the selective reflection panel 130 and proceeds upward when the incident angle A of the light is less than a predetermined angle. The remaining light is reflected and continues to travel in the lower substrate 110. Accordingly, the light can reach the entire area of the lower substrate 110 by the selective reflection panel 130, so that it functions as a light guide panel.

The light input to the holographic pattern 120 is diffracted and proceeds toward the reflection panel 140. Part of the light is reflected so as to travel inside the lower substrate 110. The light diffracted and transmitting the holographic pattern 120 is then polarized by the polarization panel 150. The polarized light is reflected by the reflection panel 140 and proceeds upward. When the light is input to the selective reflection panel 130, the light having the incident angle A which is not less than a predetermined angle is reflected, while the light having the incident angle A which is less than the predetermined angle transmits the selective reflection panel 130 and is incident on the liquid crystal layer 104.

An electric signal is applied to the lower electrode 105 and the upper electrode 103 to make liquid crystal molecules in the liquid crystal layer 140 oriented in an appropriate direction according to an image to be displayed. The liquid crystal molecules make the light transmit toward the upper substrate 102 or block the light, according to the direction of orientation. Accordingly, a desired image is displayed on the liquid crystal display device.

Consequently, the lower substrate 110 constitutes a backlight apparatus with the light source 160, the selective reflection panel 130, and the microstructure.

As described above, the liquid crystal display device according to the present invention does not need a light guide panel as in the conventional liquid crystal display device. Thus, a thin liquid crystal display device can be realized at a relatively low cost. Since an optical medium, that is, the light guide panel, is omitted in a passage from the light source to the liquid crystal layer, loss of light can be reduced so that an efficiency of use of light can be improved. Also, since various elements functioning as a backlight apparatus, for example, the selective reflection panel and the microstructure, are provided with respect to the lower substrate, all steps with respect to the lower substrate can be performed in a manufacturing process of the liquid crystal display device.

In the exemplary embodiment shown in FIG. 2, the polarization panel 150 is separately provided. However, the selective reflection panel 130 can be formed to function as a polarization panel. Thus, an additional polarization panel is not needed.

Figure 3:
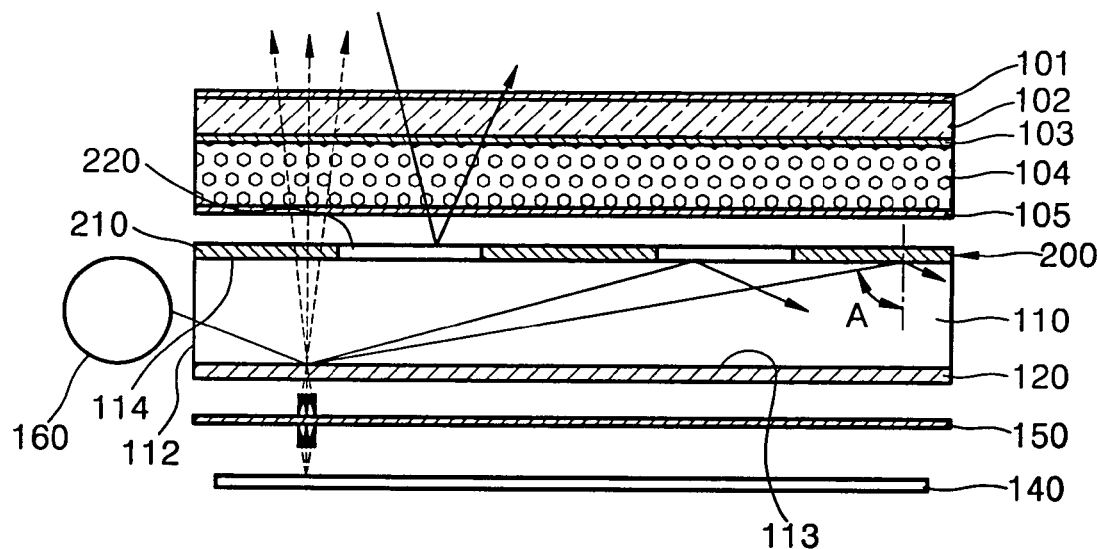
FIG. 3 is a sectional view illustrating a liquid crystal display device according to another illustrative, non-limiting embodiment of the present invention.
Figure 4:
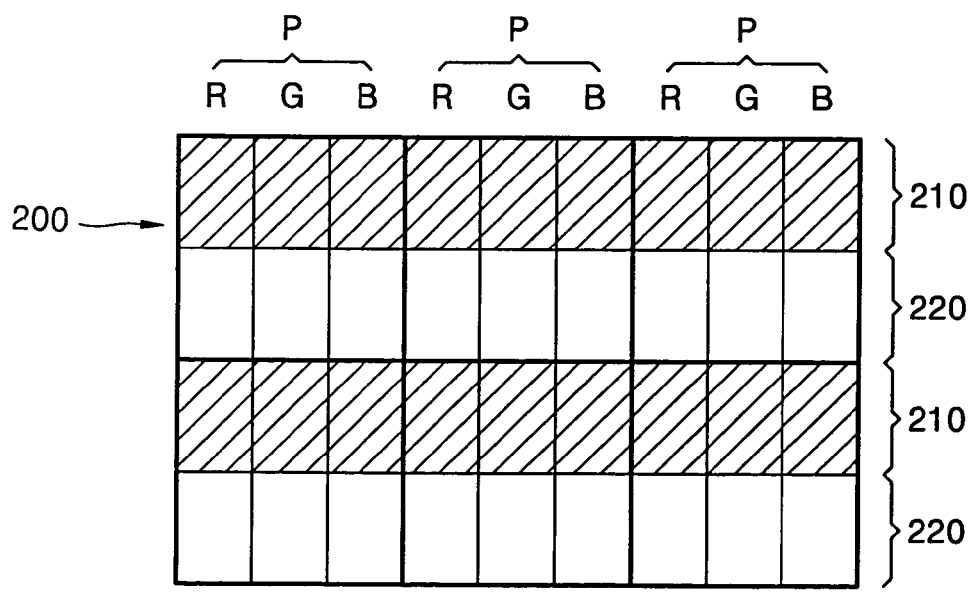
FIG. 4 is a plan view illustrating an optical panel shown in FIG. 3.

FIG. 3 shows the liquid crystal display device according to another illustrative, non-limiting embodiment of the present invention. FIG. 4 shows an optical panel 200.

Referring to FIG. 3, the liquid crystal display device according to another illustrative, non-limiting embodiment of the present invention has almost the same structure as that of the previous embodiment. In the present embodiment, instead of the selective reflection panel 130, an optical panel 200 is formed on the upper surface 114 of the lower substrate 110 to realize a semi-transparent type liquid crystal display device.

As shown in FIG. 4, the optical panel 200 includes a selective reflection portion 210 reflecting light having a predetermined incident angle or greater and transmitting the remaining light, and a total reflection portion 220 reflecting all light, for each pixel P which is obtained by dividing the upper surface 114 of the lower substrate 110 pixel by pixel. At least one selective reflection portion 210 and at least one total reflection portion 220 are formed in one pixel P. For a color liquid crystal display device, a pixel P is made of three pixels of R (red), G (green), and B (blue).

The selective reflection portion 210 acts as the selective reflection panel 130 of FIG. 2. The total reflection portion 220 reflects all of the light input through the upper substrate 102 from the outside and the light emitted from the light source 160 and proceeding in the lower substrate 110.

In the operation and effects of the liquid crystal display device having the above structure according to another exemplary embodiment of the present invention, the light emitted from the light source 160 is incident on the lower substrate 110 through the side surface 112. In the lower substrate 110, the light is incident on the selective reflection portion 210, the total reflection portion 220, and the holographic pattern 120. Part of the light incident on the holographic pattern 120 is reflected to proceed to other areas of the lower substrate, while part of the light is diffracted to proceed toward the reflection panel 140. Here, the light proceeding toward the reflection panel 140 is polarized as it passes though the polarization panel 150. The light reflected by the reflection panel 140 proceeds upward and is incident on the total reflection portion 220 or the selective reflection portion 210. Of the selective reflection portion 210, the light having the incident angle A of over a predetermined angle and the light incident on the total reflection portion 220 are reflected and uniformly propagated throughout the overall areas of the lower substrate 110. The light directly incident on the optical panel 200 without contacting the holographic pattern 120 is uniformly propagated inside the lower substrate 110 in the above-described process. Of the light incident on the selective reflection portion 210, the light having the incident angle A within a predetermined angle is transmitted and proceeds upward.

The light incident from the outside is reflected by the total reflection portion 220 proceeds toward the liquid crystal layer 104 or can be incident on the lower substrate 110 through the selective reflection portion 210.

The above-described liquid crystal display device having the above structure has the following effects in addition to the effects obtained by the previous embodiment shown in FIG. 2.

The liquid crystal display device according to the present embodiment can be operated in two modes. That is, when the liquid crystal display device is used in a bright space, since an external light can be used, power consumption can be reduced by decreasing the output power of the light source 160. In a dark space, since the external light source cannot be used, the light emitted from the light source 160 is used.

FIG. 5 is a sectional view illustrating a liquid crystal display device according to yet another illustrative, non-limiting embodiment of the present invention. Referring to FIG. 5, a liquid crystal display device according to the present illustrative, non-limiting embodiment has a structure almost similar to that of the liquid crystal display device shown in FIG. 4, except that the holographic pattern 120 is not formed throughout the entire lower surface 113 of the lower substrate 110, but only in an area where the light diffracted by the holographic pattern 120 can pass through the selective reflection portion 210.

When the holographic pattern 120 is formed throughout the entire surface of the lower surface 113 as shown in FIG. 4, the light proceeding toward the total reflection portion 220 of the light proceeding upward by being diffracted by the holographic pattern 120 is reflected and propagated in the lower substrate 110 and re-incident on the holographic pattern 120, and the above process is repeated. However, when the holographic pattern 120 is formed only in an area where the light diffracted by the holographic pattern 120 can pass through the selective reflection portion 210 as in the present embodiment, the length of an optical path until the light escapes from the lower substrate 110 is shortened so that the amount of light lost by being absorbed by a medium while traveling along the optical path is decreased. Thus, an efficiency of use of light is improved. That is, although a light source having the same output power is used, a brighter liquid crystal display device can be realized.

As described above, according to the liquid crystal display device according to the present invention, the liquid crystal display device can be made thin by using the lower substrate as the light guide panel. Also, the cost for manufacturing can be decreased and the loss of light can be reduced. Thus, when the light source having the same output power is used, a brighter liquid crystal display device can be realized.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A liquid crystal display device for displaying an image by changing orientation of a liquid crystal layer sealed between two substrates, the device comprising:
   a lower substrate having a microstructure which outputs light incident on a side surface of the lower substrate to an upper surface of the lower substrate;
   a light source emitting light to the side surface of the lower substrate;
   a selective reflection panel provided on the upper surface of the lower substrate to reflect light having a predetermined incident angle or more and transmit the remaining light; and
   a reflection panel provided under the lower substrate,
   wherein the selective reflection panel is configured to reflect the light having an incident angle that is greater than 42° with respect to a plane perpendicular to the upper surface of the lower substrate.

2. A liquid crystal display device for displaying an image by changing orientation of a liquid crystal layer sealed between two substrates, the device comprising:
   a lower substrate having a microstructure which outputs light incident on a side surface of the lower substrate to an upper surface of the lower substrate;
   a light source emitting light to the side surface of the lower substrate;
   a selective reflection panel provided on the upper surface of the lower substrate to reflect light having a predetermined incident angle or more and transmit the remaining light; and
   a reflection panel provided under the lower substrate,
   wherein the selective reflection panel is configured to reflect the light having an incident angle that is greater than 30° with respect to a plane perpendicular to the upper surface of the lower substrate.

3. A liquid crystal display device for displaying an image by changing orientation of a liquid crystal layer sealed between two substrates, the device comprising:
   a lower substrate having a microstructure which outputs light incident on a side surface of the lower substrate to an upper surface of the lower substrate;
   a light source emitting light to the side surface of the lower substrate;
   a selective reflection panel provided on the upper surface of the lower substrate to reflect light having a predetermined incident angle or more and transmit the remaining light; and
   a reflection panel provided under the lower substrate,
   wherein the microstructure is a holographic pattern having a diffraction grating structure,
   wherein the holographic pattern is formed at at least one of a lower surface and the upper surface of the lower substrate, and
   wherein the holographic pattern is formed at the upper surface of the lower substrate.

* * * * *